Aug. 13, 1946.  W. A. MARSHALL, JR  2,405,924
VALVE TESTING MACHINE
Filed Sept. 26, 1942  3 Sheets-Sheet 1

Inventor:
William A. Marshall, Jr.
By Joseph O. Lange  Atty

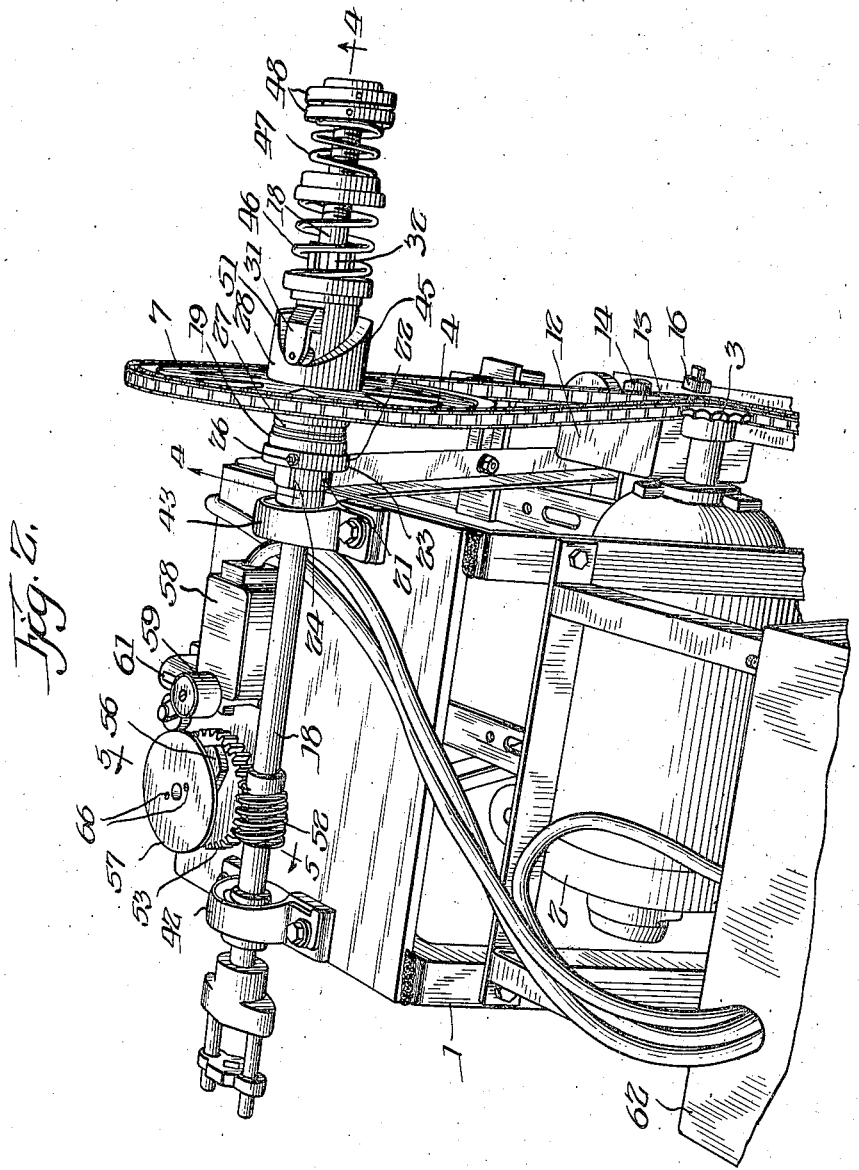

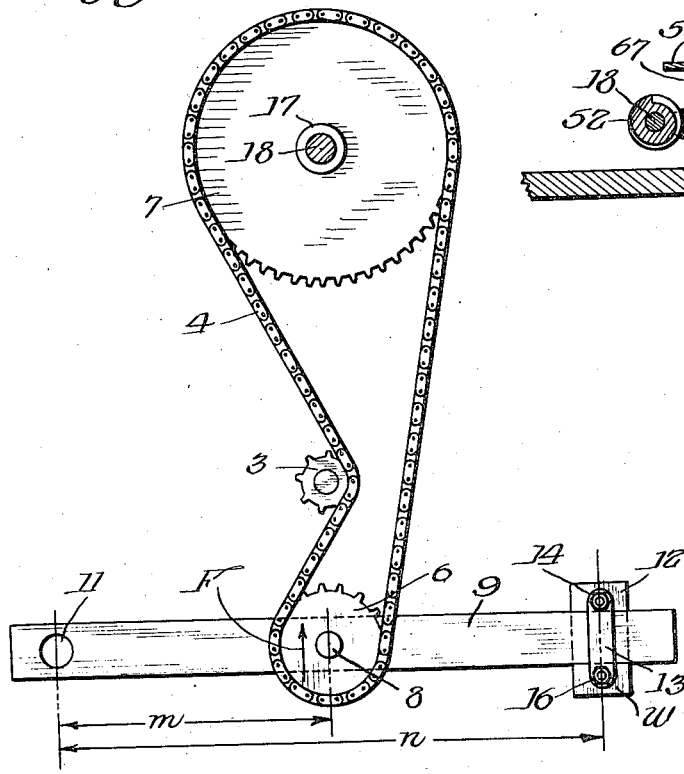
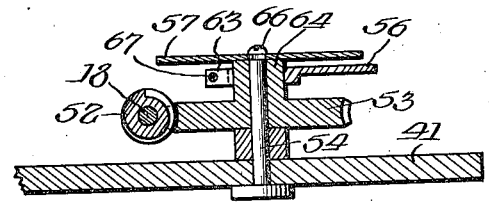
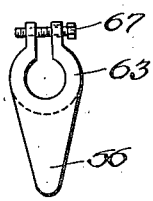
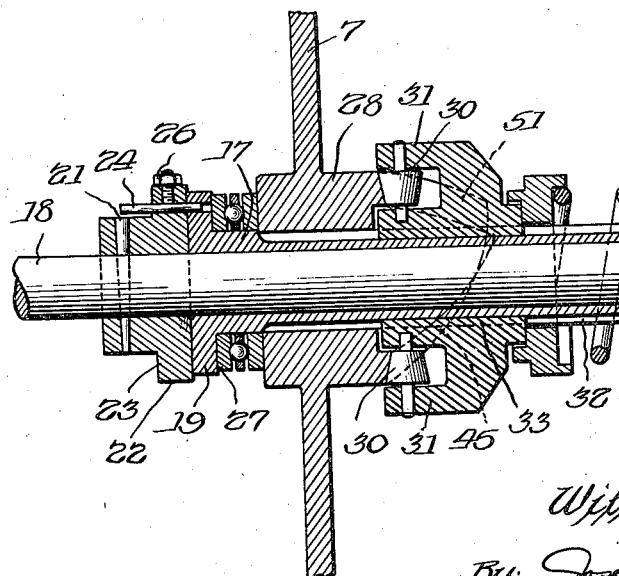

Patented Aug. 13, 1946

2,405,924

UNITED STATES PATENT OFFICE 2,405,924

VALVE TESTING MACHINE

William A. Marshall, Jr., Oak Park, Ill., assignor to Crane Co., Chicago, Ill., a corporation of Illinois Application September 26, 1942, Serial No. 459,865

7 Claims. (Cl. 73—7)

This invention relates to a new and improved valve testing machine and has for one of its principal objects the provision of novel mechanical means for operating valves for purposes of close observation and test in a manner simulating manual valve operation in the field.

It is largely the purpose of valve testing machines as used by manufacturers of valves to determine the life expectancy of valves under varied conditions of service and should thereby enable such manufacturer to properly design valves and to reasonably assure the satisfactory performance of the valve for a term of service corresponding to the test results evidenced by the novel valve testing machine embodying this invention. Valve testing machines have been employed previously but these prior machines introduced so many variables that data gained by their use was not accurate and therefore was not reliable.

It is therefore an important object of this invention to overcome the deficiencies of former valve testing machines in that the undesirable variables have been eliminated or else reduced to a minimum thereby making it possible now to obtain consistently accurate test data for use in comparison with the performance of other similar valves. It has also been recognized that the maximum closing torque attainable with the present type of valve testing machines is not sufficient to test all sizes of valves and, in addition, the maximum number of opening turns provided by such machines is relatively small and is not sufficiently flexible to meet the variable conditions encountered in actual valve operating conditions. In contradistinction to such obvious disadvantages, the torque arrangement of the valve testing machine of this invention is variable within a wide range of limits and the machine is capable of adjustment at any number or fraction of a number of opening turns as desired for the particular valve being tested.

Another important object of this invention is to provide a valve testing machine which is capable of constant or uniform repeating action. That is to say, the machine of this invention, at a particular setting thereof, will cause the closure member of a valve to be seated predeterminedly with the same amount of torque each time the closure member is reciprocated and likewise will cause the valve to be opened at a predetermined number of turns.

A still further important object of this invention is to provide a novel valve testing machine which embodies a relatively durable construction and is adaptable to economical manufacture as well as involving only a minimum of wear in the operating parts.

Other and further important objects will become apparent from the disclosures read in light of the accompanying specification and drawings, in which Fig. 1 is a perspective assembly view of the valve operating machine of this invention.

Fig. 2 is a fragmentary perspective view showing an enlarged upper portion of the machine.

Fig. 3 is a force diagram incorporating the mechanism related to the closing of the valve to be tested.

Fig. 4 is a sectional view taken through the valve driving shaft on the line 4—4 of Fig. 2.

Fig. 5 is a sectional view taken through the opening turn adjustment mechanism on the line 5—5 of Fig. 2.

Fig. 6 is a detail of the cam switch actuator.

Figure 1:
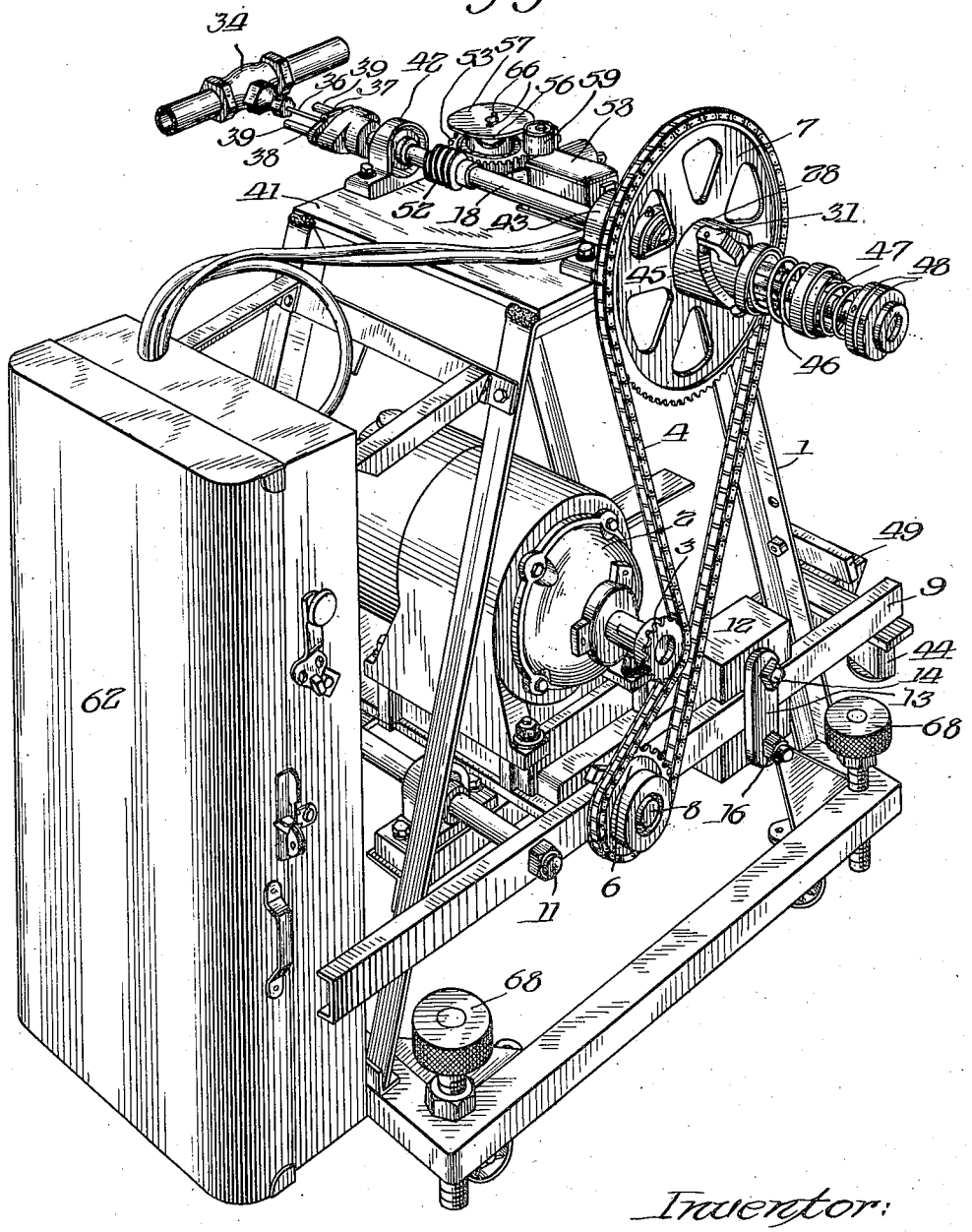

As shown in the drawings, the reference numeral 1 in Fig. 1 indicates generally the frame on which is mounted the valve testing machine of this invention and having the adjustable legs 68 by means of which the machine is placed in a level position. The numeral 2 indicates a motor or the like driving means attached to the frame 1 and which is adapted to directly rotate the sprocket 3 thereby driving the chain 4 which is held extended by the idler sprocket 6 and the driven sprocket 7. The idler sprocket 6 is journaled on the shaft 8 and is rigidly affixed to the arm 9 which latter member is pivotable about the shaft 11. A weight 12 is slidably adjustable along the arm 9 and is preferably held in fixed position by the bracket 13 bolted at 14 and 16, as indicated. The driven sprocket 7 is journally supported on the sleeve 17 (see Fig. 4) within which the driven shaft 18 is journaled.

As best shown in Fig. 4, the sleeve 17 is provided at one end with an outwardly extending annular flange 19 which facilitates the interlocking relationship between the sleeve 17 and the shaft 18. A collar 22 is affixed to the shaft 18 by means of the taper pin 21 and is provided with an annular shoulder 23 through which a shear pin 24 passes transversely thereof and continues through the anular flange 19. This ararngement thereby acts as a safety element should the test valve being operated become stuck or a similar situation arise. Obviously the employment of a rigid driving mechanism without a safety element or device incorporated therein might cause irreparable damage. The shear pin 24 is held firmly in position by means of the set screw 26 entering through the periphery of the shouldered portion of the collar 22.

Positioned between the annular flange 19 and the sprocket 7 is a thrust bearing 27. The sprocket 7 is provided with a unitary cam member 28 and thereby causes the sprocket 7 and the cam 28 to function together as an integral member. A cam follower 31 (see Fig. 4) is adapted to slide reciprocably along a splined surface 32 of the sleeve 17 by reason of the oppositely splined internal ring 33 of the cam follower 31. Relative rotation of the cam follower 31 with respect to the sleeve 17 is prohibited, but both the sprocket 7 and the cam 28 are permitted free rotation with respect to the sleeve 17. Two inclined rollers 30 form a part of the cam follower 31 and aid in reducing friction between the follower 31 and the cam surface 45.

As shown more clearly in Fig. 1, a valve 34 to be test-operated is preferably positioned at the end of the shaft 18. As shown, the valve handwheel normally used for operation has been removed and the valve stem 36 is firmly gripped within the collar 37 by means of the set screws 38. The collar 37 is directly driven by the shaft 18 through the fork-like connecting member 39. The frame work of the machine, as indicated, is supplied with a flat supporting top 41 to which are attached the aligned bearings 42 and 43 through which the shaft 18 passes and is maintained journally rotatable.

Upon closing the valve 34 the motor 2 is operated in a counterclockwise direction thereby causing the chain to travel downwardly on the right side and upwardly on the left side when viewed in facing the sprocket 7, as shown in Figs. 1 and 3. It is apparent that the tension in the chain 4 from the intermediate sprocket 3 to the lower sprocket 6 is substantially equal to the tension in the chain 4 from the upper sprocket 7 to the sprocket 6. It will be further evident that both of these tension forces tend to lift or to pivotally displace the idler sprocket 6. For this reason it is necessary to have a force equal to the aggregate or sum of these two tension forces exerted downwardly on the idler sprocket 6 in order that the latter mentioned sprocket may thereby maintain a relatively fixed position during the course of normal valve operation. The desired downward force is obtained by providing for the weight 12 being movable and slidably adjustable along the arm 9.

It will be apparent that the proper adjustment and positioning of the weight 12 effect a resultant force downwardly of slightly greater magnitude than the combined upward tension forces as exerted by the portions of the chain 4. Thus regardless of the number of turns or revolutions of the stem 36 necessary in order to close the valve 34, the motor 2 will continue to run in the same direction until such time as the valve 34 has its closure member (not shown) properly and firmly seated whereupon the motor 2 will reverse its running direction.

It is well understood by those skilled in the art that the final seating of a valve closure member in order to effect desirable valve tightness must necessarily be accompanied by an increased amount of torque being applied to the valve handwheel. Further, as the closure member of the valve 34 to be tested approaches its seat it moves with increased resistance, causing the tension in the chain 4 between the sprockets 7 and 6 and 3 and 6 to increase thereby causing the cam follower 31 to move upward along the inclined surface 45 of the cam 28. At a location somewhere along the inclined surface 45 of the cam 28 the valve 34 will be closed and at such location the upward force caused by the increasing tension in the chain becomes greater than the downward force caused by the weight 12 on the arm 9. Before actual closing of the valve but during the course of the normal closing operation of the valve 34 it will be seen by the diagram in Fig. 3 that $nW$ is greater than $mF$, wherein $n$ is the distance between the pivot point 11 and the effective axis or center of gravity of the weight 12, in which statement W is the weight 12, $m$ is the distance between the pivot point 11 and the vertical axis through the sprocket 6, and F is the upward force exerted by the tension in the chain 4. Thus when the valve closure member approaches the closing position the force F increases to such an extent that the equation reverses and becomes greater than $nW$ causing the arm 9 to rise and, as best shown in Fig. 1, thereby actuating the motor-reversing switch 44. It is further clear that the cam follower 31 is loaded constantly under the influence of the spring pressure provided by means of the springs 46 and 47 supported by the nuts 48 threadedly engaging the shaft 18. A stop 49 attached to the frame work 1 limits the upward movement of the arm 9.

Upon reversing the direction of the motor operation the sprocket 7 also reverses its motion to a counter-clockwise rotation thus causing the closure member of the valve 34 to be lifted from its seat. As best shown in Fig. 4, the inclined surface on the cam 28, namely 51, is more steep than the incline 45 thereby prohibiting upward movement of the cam follower on the incline 51. A positive drive is therefore maintained between the motor 2 and the valve 34 when the latter is being opened. For purpose of greater safety the shear pin 24 is supplied intermediate this direct drive, so that if the valve should become jammed or otherwise rendered ineffective for operation, the shear pin will break first thereby acting as a safety element.

A significant advantage of the machine of this invention lies in its being readily adjustable so that it will open the valve the desired number of turns. This desirable objective is accomplished by means of a worm gear 52 which is mounted in non-rotatable relation with the shaft 18 and which gear, in turn, engages the worm gear 53, the latter being free to revolve on a vertical spindle 54 (Fig. 5). A cam 56 having a split collar 63 is clamped by means of the bolt 67 drawing the split collar together on the hub 64 of the worm gear 53 (Fig. 5). A flat circular dial 57 indicating settings between zero and the maximum number of turns which the machine is capable of making for opening a valve is affixed to the stationary spindle 54 by means of the screws 66. An index line on the cam coincides with the zero marking on the dial and by moving the cam with respect to the worm gear, any number or a fraction of turns up to the maximum can be obtained in machine operation. A switch 58 (Fig. 1) having a cylindrical journaled element 59 is adapted to be actuated by the cam 56. The latter member, as previously stated, is clamped to the hub 64 of the worm gear 53. Simultaneous with the operation of the switch 58, a counter 61 is also actuated and records the number of operations or cycles of the valve occurring between the opening and closing positions as made by the valve testing machine. It can be readily seen that if the cam is set so that it strikes the switch actuator 59 almost immediately after the shaft 18 begins rotation in a counter-clockwise direction, then the valve being operated will not be opened to any substantial extent. However, if the cam is set with relation to the switch actuator element so that it requires several turns of the shaft 18 before the element 59 is struck, then the closure member of the valve to be operated will be lifted from its seat with the desired amount of travel or valve lift as it is termed. The dial 57 may be so calibrated that the cam 56 is set for any number of rotations of the shaft 18 before the switch and its actuator 59 have been reached by the cam. Actuation of the switch 58 causes the motor to again reverse and the closing cycle of the valve as previously described is repeated. A control panel 62 is mounted on the frame work 1 and incorporates all of the electrical wiring necessary for the proper operation of this valve testing machine. The latter wiring is conventional and it is therefore deemed unnecessary to describe in greater detail.

Each switch, namely 44 and 58, will act only to reverse the motor in one direction, and if the motor is already running in that direction, any actuation of the particular switch will have no effect. In further explanation, the switch 44 will cause the motor to reverse only when the machine has been acting to close the valve and likewise the switch 58 will cause the motor to reverse only when the machine has been acting to open the valve. This valve testing machine is therefore arranged to operate only within predetermined limits making it impossible for more than the maximum torque to be applied regardless of the position of the closure member of the valve to be tested and also making it impossible to open the valve a greater distance than would be permitted with the fixed number of turns based on the closed position. The latter is true regardless of whether the closure member was seated or not when the operation began.

I am aware that numerous details of construction may be varied throughout a wide range without departing from the principles and purposes of my invention, and I therefore do not intend limiting the scope of my patent otherwise than as necessitated by the prior art.

I claim:

1. A valve testing machine for actuating a valve stem, comprising in combination a framework, driving means, a sprocket driven by said driving means, a pivotable arm mounted on the said framework, an idler sprocket rotatably journaled on the pivotable arm, a weight adjustably movable along the pivotable arm, a switch for reversing the direction of the said driving means operable by the predetermined movement of the said pivotable arm, a larger driven sprocket mounted on the said framework, a chain extending between the idler sprocket and the larger sprocket and driven by the sprocket driven by the said driving means, a rotatable shaft adapted to actuate a valve by rotation of its stem, a sleeve telescopically mounted on the said shaft and over which the large sprocket is rotatably journaled, an annular flange cooperating with the said sleeve, a collar attached to the said shaft and adapted to abut the said annular flange of the sleeve, a shear pin transversely mounted relative to the said collar and the said flange, a cam attached to said large sprocket journally mounted on the said sleeve, a cam follower adapted to engage a splined portion of the said sleeve whereby the cam follower may move axially with relation to the said sleeve, means on the said shaft for maintaining the said cam follower in resilient relationship with the said cam.

2. A valve testing machine comprising a supporting member, driving means including a drive sprocket, a pivotable arm mounted on said supporting member, an idler sprocket affixed at a point along the pivotable arm, a weight adjustably movable upon the pivotable arm, a switch for reversing the direction of the said driving means operable by the predetermined movement of said arm, a driven sprocket mounted on the said supporting member, a chain extending between the said idler sprocket and the driven sprocket and actuated by the said drive sprocket, a shaft adapted to operate a valve to be tested, a sleeve mounted on the said shaft, the said driven sprocket being rotatably journaled upon the said shaft, a flanged portion at one end of the said sleeve, a collar attached to the said shaft and adapted to cooperate with the flanged portion of the said sleeve, a shear pin passing through the said collar and the said flange, a cam forming an integral part of said driven sprocket journally rotatable on the said sleeve, the said sleeve being externally splined at one end, a cam follower internally splined and adapted to engage the splined portion of the said sleeve whereby the cam follower may ride on the said cam and move axially relative to the said sleeve, means on the said shaft for maintaining the said cam follower in abutting relationship with the said cam, a worm gear cooperating with the said shaft, a second worm gear driven by said first named worm gear, a second cam attached to a hub portion of the said second worm gear and adjustably movable relative thereto, a second switch actuated by the said latter cam whereby the direction of rotation of the said driving means may be predeterminedly reversed.

3. A valve testing machine comprising a mounting, a shaft on said mounting adapted to operate a valve by means of its valve stem, means comprising a reversible electric motor for driving the said shaft, said means comprising a drive sprocket, a pivotable arm on the said mounting, an idler sprocket on the said pivotable arm, a switch actuated by the predetermined movement of the said arm, a driven sprocket mounted about the said shaft, a chain extending between the idler sprocket and the the driven sprocket and operated by the drive sprocket, the latter sprocket being positioned intermediate the idler and driven sprockets, means for indirectly connecting the said driven sprocket to the said shaft, the said means being subject to variations in chain tension and comprising a sleeve having an annular flange upon which the driven sprocket is journally mounted, a collar member attached to the said shaft and adapted to cooperate with said annular flange portion of the said sleeve, a frangible pin passing transversely of the said collar and the said flange, a cam attached to the said driven sprocket journally rotatable on the said sleeve, a cam follower adapted to engage a splined portion of the said sleeve whereby the cam follower may ride on the said cam and move axially relative to the said sleeve, resilient means on the said shaft for maintaining the said cam follower cooperatively with the said cam, a worm gear on the said shaft, a second worm gear driven by the said first named worm gear, a cam adjustably attached to a hub portion of the said second gear and movable therewith, a second switch actuated by the said cam, whereby when the tested valve is being closed the said cam follower will move upon its said associated cam, the tension in the said chain increases to a point where the said pivotable arm is lifted whereby the first named switch is actuated thereby causing the rotative direction of the said shaft to be reversed whereupon the tested valve stem is actuated a predetermined number of turns as fixed by the positioning of the said cam relative to the second named worm gear and whereby when the cam actuates the second named switch the shaft is again reversed causing the valve to repeat its operating cycle, each of the said switches being operative to control the direction of operation of the said motor.

4. In a valve testing machine, a rotatable shaft for operating a valve, a driven sprocket for rotating said shaft, an arm journaled for pivotal movement, an idler sprocket journaled on the free end of said arm, an endless chain extending around said driven sprocket and idler sprocket, a driving sprocket for said endless chain, electrical reversible motor driving means for said driving sprocket, and a switch actuated by predetermined movement of said arm for reversing direction of rotation of said driving means upon seating of a valve being tested.

5. In a valve testing machine, a rotatable shaft for operating a valve, a driven sprocket for rotating said shaft, an arm journaled for pivotal movement, an idler sprocket journaled on the free end of said arm, an endless chain extending around said driven sprocket and idler sprocket, a driving sprocket for said endless chain, electrical reversible motor driving means for said driving sprocket, a switch actuated by predetermined movement of said arm for reversing direction of rotation of said driving means upon seating of a valve being tested, and means for varying the force required for moving said arm for actuating said switch to regulate the force exerted by the shaft in seating the valve being tested.

6. In a valve testing machine, a rotatable shaft for operating a valve, a driven sprocket for rotating said shaft, an arm journaled for pivotal movement, an idler sprocket journaled on the free end of said arm, an endless chain extending around said driven sprocket and idler sprocket, a driving sprocket for said endless chain, electrical reversible motor driving means for said driving sprocket, a switch actuated by predetermined movement of said arm for reversing direction of rotation of said driving means upon seating of a valve being tested, a second switch, and switch actuating means operable upon rotational movement of said shaft for actuating said second switch for reversing direction of rotation of said driving means at a predetermined open position of the valve being tested.

7. A valve testing machine of the character to be described, comprising in combination a framework, a reversible electric motor mounted on the said framework, sprocket means driven by said motor, a pivotable arm mounted on the said framework, an idler sprocket rotatably journaled on the said pivotable arm, a weight adjustably positioned upon the said pivotable arm, a switch actuated by the predetermined movement of the said arm, a second driven sprocket means on the said framework, a chain extending between the said idler sprocket and the second sprocket means and driven by the sprocket means driven by the said motor, a shaft adapted to operate a valve to be tested, a sleeve having an annular flange telescopically mounted on said shaft and over which the said second sprocket means is rotatably journaled, a collar pinned to the said shaft and adapted to cooperate with said flange portion of the said sleeve, a shear pin passing transversely of the said collar and the flange portion of the said sleeve, a cam attached to the said second sprocket means journally rotatable on the said sleeve, a cam follower, the said sleeve being splined to the said follower and adapted to engage a splined portion of the said sleeve whereby the said cam follower may ride on the said cam and move axially with relation to the said sleeve, resilient means on the said shaft for maintaining the said cam follower in abutting relationship with the said cam, a worm gear connected to said shaft, a second worm gear driven by said first named worm gear, a second cam adjustably attached to a hub portion of the second worm gear and movable therewith, a second switch actuated by said latter cam, whereby when the valve being tested is closed the said cam follower will ride upon its said associated cam and when the tension in the said chain increases to a point where the said weight is overcome the said pivotable arm lifts and thereby actuates its associated switch causing the said motor to reverse whereupon the valve to be tested is opened a predetermined number of turns and when the second switch is actuated the motor is again reversed causing the valve testing machine to repeat its operating cycle.

WILLIAM A. MARSHALL, Jr.